United States Patent
Luttinen et al.

(10) Patent No.: US 9,421,853 B2
(45) Date of Patent: Aug. 23, 2016

(54) INTEGRATED POWERTRAIN AND CHASSIS DESIGN FOR MAXIMIZED PASSENGER CABIN VOLUME OF A VEHICLE

(71) Applicant: GM GLOBAL TECHNOLOGY OPERATIONS LLC, Detroit, MI (US)

(72) Inventors: James L. Luttinen, Brighton, MI (US); Julian Broadbent, Bloomfield Hills, MI (US); Alan W. Hayman, Romeo, MI (US); William A. Bear, Novi, MI (US); James B. Borgerson, Clarkston, MI (US); Daryl A. Wilton, Macomb, MI (US); Robert E. Zeweke, Shelby Township, MI (US); Thomas A. Barth, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 89 days.

(21) Appl. No.: 14/304,279

(22) Filed: Jun. 13, 2014

(65) Prior Publication Data

US 2015/0360551 A1 Dec. 17, 2015

(51) Int. Cl.
| | |
|---|---|
| B60K 5/04 | (2006.01) |
| B60K 17/04 | (2006.01) |
| B62D 7/16 | (2006.01) |
| B60G 3/18 | (2006.01) |
| B60K 13/04 | (2006.01) |
| B62D 3/12 | (2006.01) |
| B60K 17/08 | (2006.01) |

(52) U.S. Cl.
CPC ... *B60K 5/04* (2013.01); *B60G 3/18* (2013.01); *B60K 13/04* (2013.01); *B60K 17/04* (2013.01); *B60K 17/08* (2013.01); *B62D 3/12* (2013.01); *B62D 7/16* (2013.01); *B60G 2200/156* (2013.01); *B60G 2200/44* (2013.01); *B60G 2202/132* (2013.01)

(58) Field of Classification Search
CPC .......... B60K 5/04; B60K 17/04; B60K 13/04; B62D 7/16; B62D 7/163; B62D 7/166; B60G 3/18; B60G 2200/156; B60G 2200/44; B60G 2200/132
See application file for complete search history.

(56) References Cited

U.S. PATENT DOCUMENTS

| | | | | |
|---|---|---|---|---|
| 5,069,306 A | * | 12/1991 | Inoue ..................... | B60G 11/08 180/291 |
| 5,129,476 A | * | 7/1992 | Kikuchi ................... | B60K 5/04 180/234 |
| 5,143,167 A | * | 9/1992 | Moriyama ............... | B60K 5/04 180/248 |
| 5,257,675 A | * | 11/1993 | Araki ..................... | B60K 17/06 180/297 |
| 5,529,143 A | * | 6/1996 | Komatsu .................. | B60K 5/04 180/297 |
| 5,915,494 A | * | 6/1999 | Matsumura .............. | B60K 5/04 180/232 |

* cited by examiner

*Primary Examiner* — John Walters
*Assistant Examiner* — Brian Swenson
(74) *Attorney, Agent, or Firm* — Quinn Law Group, PLLC

(57) ABSTRACT

A vehicle includes a vehicle structure that extends along a longitudinal axis. An engine includes a crankshaft that defines a crank axis disposed substantially transverse to the longitudinal axis. A transmission includes an output shaft that defines a transmission output axis substantially parallel with the crank axis. The transmission output axis is disposed nearer the forward end of the vehicle structure than the crank axis. The crank axis is disposed vertically above the transmission output axis a distance of about 140 mm. The engine includes at least one cylinder bore that defines a bore axis disposed perpendicular to and may intersect the crank axis. The bore axis may be angled toward the forward end of the vehicle structure to define an angle between the bore axis and a vertical plane. The angle between the bore axis and the vertical plane may be about 18°.

18 Claims, 3 Drawing Sheets

INTEGRATED POWERTRAIN AND CHASSIS DESIGN FOR MAXIMIZED PASSENGER CABIN VOLUME OF A VEHICLE

TECHNICAL FIELD

The invention generally relates to a vehicle, and more specifically to a powertrain and chassis configuration for a front wheel drive vehicle to increase the volume of a passenger cabin of the vehicle without increasing an overall size of the vehicle.

BACKGROUND

Typical front wheel drive vehicles include an engine that is arranged transverse to a longitudinal axis of the vehicle. A transmission is typically disposed rearward of the engine. Due to driveline geometry limitations, the position of the front wheel assemblies is directly related to the position of an output shaft of the transmission. In order to operate within the driveline geometry limitations, the front wheel assemblies cannot be positioned too far forward of the axis of the transmission output shaft. As such, the front wheel assemblies are generally centered near the axis of the transmission output shaft. Because the transmission is typically disposed rearward of the engine, and the longitudinal position of the wheel assemblies is restrained by the position of the transmission output shaft, a steering rack is typically disposed rearward of the transmission, which may limit the volume of the passenger cabin of the vehicle.

SUMMARY

A vehicle is provided. The vehicle includes a vehicle structure that extends along a longitudinal axis between a forward end and a rearward end of the vehicle. The forward end and the rearward end each extend along a cross-car axis substantially perpendicular to the longitudinal axis, such that the longitudinal axis and the cross-car axis define a horizontal plane. An engine is supported by the vehicle structure. The engine includes a crankshaft that defines a crank axis disposed transverse to the longitudinal axis of the vehicle structure, and substantially parallel with the horizontal plane. A transmission is coupled to the engine and includes a transmission output shaft engaging the crankshaft. The transmission output shaft defines a transmission output axis that is disposed substantially transverse to the longitudinal axis, and substantially parallel with the crank axis. A steering rack is supported by the vehicle structure forward of the transmission output axis. The steering rack includes a pinion extension that extends toward the rearward end of the vehicle structure. The transmission output axis may be disposed nearer the forward end of the vehicle structure than the crank axis, and the crank axis may be disposed vertically above the transmission output axis such that the pinion extension passes underneath the engine.

In another aspect of the invention, a vehicle is provided. The vehicle includes a vehicle structure that extends along a longitudinal axis, between a forward end and a rearward end. The forward end and the rearward end each of the vehicle structure, each extend along a cross-car axis, which is disposed substantially perpendicular to the longitudinal axis. The longitudinal axis and the cross-car axis define a horizontal plane. An engine is supported by the vehicle structure. The engine includes a crankshaft that defines a crank axis. The crank axis is disposed transverse to the longitudinal axis of the vehicle structure, and is disposed substantially parallel with a horizontal plane. A transmission is supported by the vehicle structure, and is coupled to the engine for receiving torque from the crankshaft. The transmission includes an output shaft that defines a transmission output axis disposed substantially transverse to the longitudinal axis and parallel with the crank axis. The transmission output axis may be disposed nearer the forward end of the vehicle structure than the crank axis. The transmission output axis may be disposed vertically below the crank axis a distance of approximately 140 mm. The engine includes at least one cylinder bore that defines a bore axis. The bore axis may be disposed perpendicular to the crank axis and may intersect the crank axis. The bore axis may be angled toward the forward end of the vehicle structure to define an angle between the bore axis and a vertical plane. The vertical plane may be disposed perpendicular to the horizontal plane and parallel with the crank axis. The angle between the bore axis and the vertical plane may be approximately 18°.

Accordingly, by positioning the transmission longitudinally forward of the engine, a wheelhouse of the vehicle is positioned longitudinally forward of the front of dash, i.e., the bulkhead of the engine compartment, thereby eliminating intrusion of the wheel house into a passenger cabin of the vehicle, thereby increasing a volume of the passenger cabin. By positioning the crank axis vertically above the transmission output axis, thereby creating vertical clearance beneath the engine, a steering rack may be positioned forward of the engine and transmission, so that a pinion extension connecting the steering rack and a steering wheel of the vehicle may pass underneath the engine. Positioning the steering rack forward of the engine eliminates intrusion into a lower front edge of the passenger cabin, thereby increasing the volume of the passenger cabin. By rotating the bore axis of the engine forward, an intake manifold is moved forward, away from the bulkhead. This powertrain and chassis configuration reduces an overall length of the powertrain and chassis, which maximizes the size of the passenger cabin without increasing an overall size of the vehicle.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a vehicle is generally shown at 20. The vehicle 20 is a front wheel drive vehicle 20 having a powertrain 22 disposed transverse to a longitudinal axis 24 of the vehicle 20.

Figure 1:
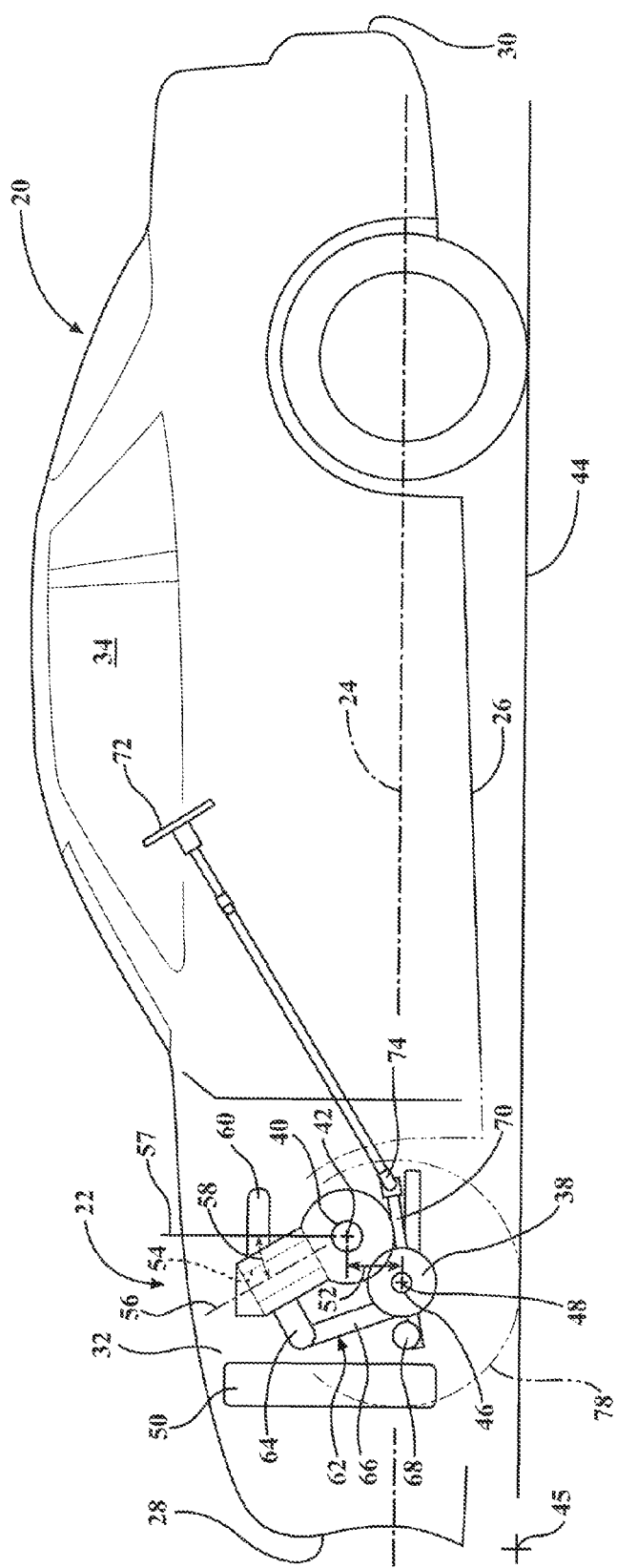
FIG. 1 is a schematic side view of a vehicle.

Referring to FIG. 1, the vehicle 20 includes a vehicle structure 26 that extends along the longitudinal axis 24, between a forward end 28 and a rearward end 30. It should be appreciated that the forward end 28 may be defined as the front of the vehicle 20, and the rearward end 30 may be defined as the rear of the vehicle 20. The longitudinal axis 24 runs between the forward end 28 and the rearward end 30, and is disposed at an approximate center of the vehicle structure 26. The forward end and the rearward end each extend along a cross-car axis. The cross-car axis is disposed substantially perpendicular to the longitudinal axis, such that the longitudinal axis and the cross-car axis define a horizontal plane. 44. The vehicle structure 26 may include a frame and body vehicle structure 26, commonly referred to as a uni-body vehicle structure 26. The vehicle structure 26 supports the various components of the vehicle 20, including the powertrain 22, body panels, accessories, etc. The vehicle structure 26 defines an engine compartment 32, wherein the powertrain 22 is disposed, and a passenger cabin 34 for occupants.

The powertrain 22 includes, but is not limited to, an engine 36 and a transmission 38. The engine 36 is supported by the vehicle structure 26, and is disposed within the engine compartment 32. The engine 36 may include any suitable style of engine 36, such as but not limited to an internal combustion engine 36. The engine 36 may include, but is not limited to, a gasoline engine 36 or a diesel engine 36. Typically, the engine 36 may include a four cylinder in-line gasoline engine 36. However, it should be appreciated that the scope of the claims are not limited to the type and/or style of the engine 36 used. The engine 36 includes a crankshaft 40, which defines a crank axis 42. The cranks shaft rotates about the crank axis 42. The crank axis 42 is disposed transverse to the longitudinal axis 24 of the vehicle structure 26, and is substantially parallel with the horizontal plane 44.

The transmission 38 is also supported by the vehicle structure 26, and is disposed within the engine compartment 32. The transmission 38 is coupled to the engine 36 for receiving torque from the crankshaft 40. The transmission 38 transfers torque from the engine 36 to one or more drive wheels of the vehicle 20 as is known. The drive wheels may include the front wheels of the vehicle 20, the rear wheels of the vehicle 20, or both the front and rear wheels of the vehicle 20. The transmission 38 includes an output shaft 46 that defines a transmission output axis 48. The output shaft 46 rotates about the transmission output axis 48. The transmission output axis 48 is disposed transverse to the longitudinal axis 24, substantially parallel with the horizontal plane 44, and is parallel with the crank axis 42.

A Combined Radiator Fan Module (CRFM 50) 50 is disposed adjacent the forward end 28 of the vehicle 20, and is operable to transfer heat from a cooling liquid to a flow of air flowing across and through the CRFM 50. The transmission output axis 48 is disposed nearer the forward end 28 of the vehicle structure 26 than the crank axis 42. As such, the transmission output axis 48 is disposed longitudinally, along the longitudinal axis 24, between the CRFM 50 and the crank axis 42. The crank axis 42 is disposed vertically above the transmission output axis 48. In other words, the crank axis 42 is disposed at a higher elevation relative to the horizontal plane 44 than the transmission output axis 48. As such, the crank axis 42 is spaced farther from the horizontal plane 44 than the transmission output axis 48. While the crank axis 42 is disposed vertically above the transmission output axis 48, it should be appreciated that the crank axis 42 is disposed more rearward than the transmission output axis 48, i.e., the transmission output axis 48 is disposed closer to the front of the vehicle 20 along the longitudinal axis 24 than the crank axis 42 is. As such, the crank axis 42 is not disposed directly over the transmission output axis 48, i.e., the crank axis 42 and the transmission output axis 48 are not disposed at the same location along the longitudinal axis 24, but rather, the crank axis 42 is disposed at a higher elevation than the transmission output axis 48 relative to the horizontal plane 44.

The transmission output axis 48 may be disposed below the crank axis 42 a distance 52 of approximately 140 mm. In some embodiments, the transmission output axis 48 may be disposed below the crank axis 42 a distance 52 of at least 140 mm, while in still other embodiments, the distance 52 may be between the range of 137 mm and 147 mm. In a non-limiting exemplary embodiment, the distance 52 may equal 141 mm.

The engine 36 includes at least one cylinder bore 54 defining a bore axis 56. As noted above, the engine 36 may include a four cylinder engine 36, defining four different bores, with each bore defining a bore axis 56. However, the scope for the claims is not limited to the number of bores of the engine 36. The bore axis 56 is disposed perpendicular to the crank axis 42, and may intersect the crank axis 42. As is known, a piston (not shown) of the engine 36 moves in a reciprocating motion within the bore, along the bore axis 56. The bore axis 56 is angled toward the forward end 28 of the vehicle structure 26, i.e., toward the forward end 28 of the vehicle 20, to define an angle 58 between the bore axis 56 and a vertical plane 57. The vertical plane is disposed substantially perpendicular to the horizontal plane 44 and parallel with the crank axis 42. The angle 58 between the bore axis 56 and the vertical plane 57 may be at least 15°. In some embodiments, the angle 58 between the bore axis 56 and the vertical plane 57 is approximately 18°, and in other embodiments, the angle 58 may be between 17° and 21°, or between some other angular range such that the angle 58 between the bore axis 56 and the vertical plane 57 allows for the inlet manifold assembly, and/or the exhaust assembly, to be packaged in a package width, measured along the longitudinal axis 24 on the horizontal plane 44, that is substantially equal to a package width of the transmission 38, measured along the longitudinal axis 24 on the horizontal plane 44.

An intake manifold 60 is attached to the engine 36, and is operable to provide a flow of combustion air into the cylinder bores 54 of the engine 36 as is known. The intake manifold 60 is disposed vertically above and arranged over the crank axis 42 of the crankshaft 40. As such, the intake manifold 60 is disposed at a higher elevation relative to the horizontal plane 44 than the crank axis 42. The intake manifold 60 is spaced farther from the horizontal plane 44 than the crank axis 42. Additionally, the intake manifold 60 and the crank axis 42 are substantially co-located along the longitudinal axis 24, i.e., the intake manifold 60 and the crank axis 42 each have the same approximate location along the longitudinal axis 24 of the vehicle 20, such that the intake manifold 60 is located over and covers the crank axis 42.

An exhaust system 62 is attached to the engine 36, and is operable to conduct a flow of exhaust gas from the engine 36 to an outlet, typically located near the rearward end 30 of the vehicle 20. The exhaust system 62 includes an exhaust manifold 64 that is attached to the engine 36, and a passage 66 that is connected to the exhaust manifold 64. The exhaust manifold 64 is disposed nearer the forward end 28 of the vehicle structure 26 than the engine 36. As such, the exhaust manifold 64 is disposed between the CRFM 50 and the engine 36. The passage 66 extends downward, in front of the engine 36, between the CRFM 50 and the engine 36, nearer the forward end 28 of the vehicle structure 26 than the engine 36. The passage 66 further passes underneath the engine 36. As such, the portion of the passage 66 disposed underneath the engine 36 is spaced nearer to the horizontal plane 44 than the engine 36.

Figure 2:
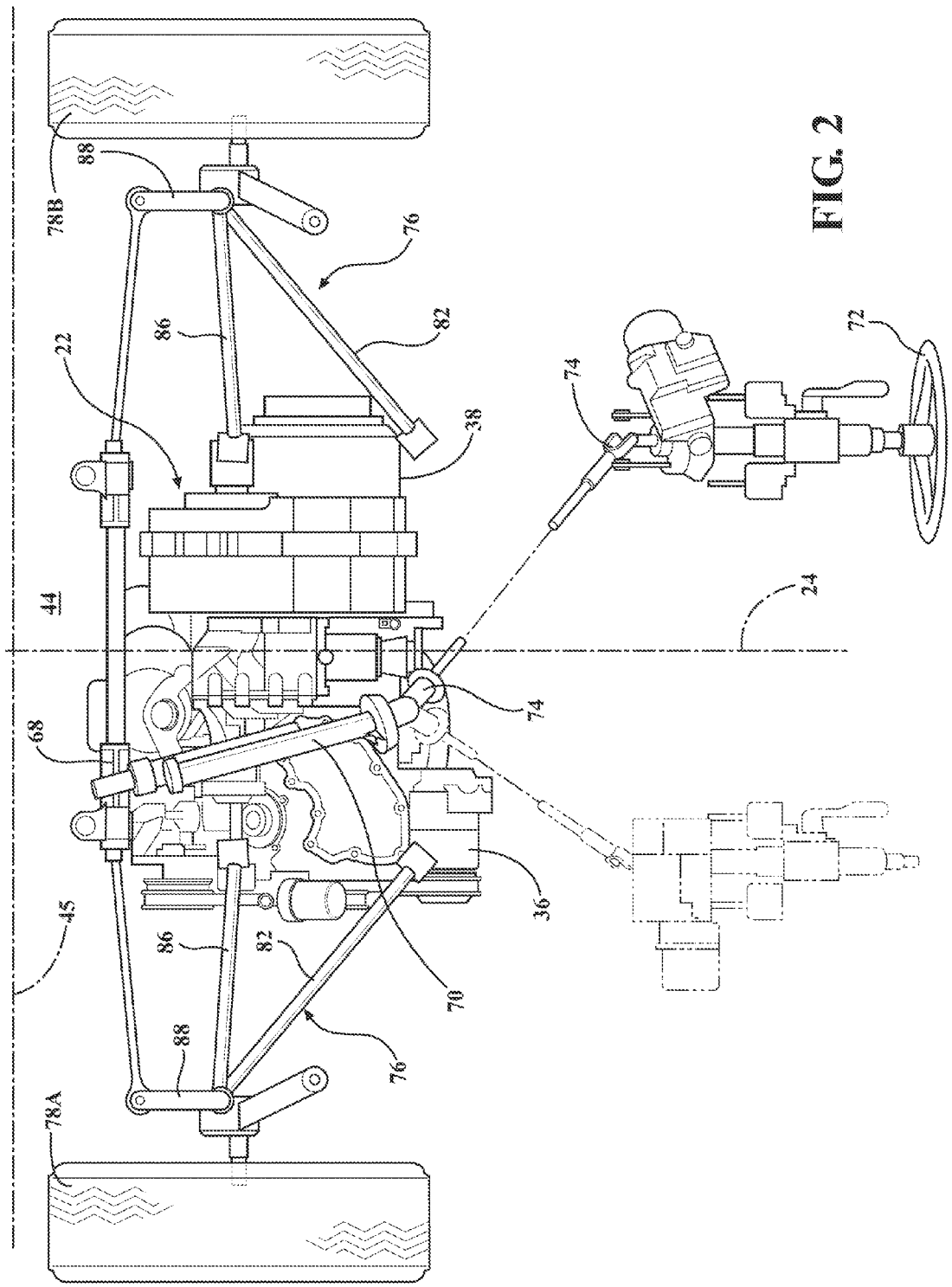
FIG. 2 is a schematic plan view from below showing a powertrain and chassis system of the vehicle.

A steering rack 68 is supported by the vehicle structure 26, within the engine compartment 32. The steering rack 68 is disposed nearer the forward end 28 of the vehicle structure 26 than the transmission 38. As such, the steering rack 68 is disposed between the CRFM 50 and the transmission 38, as well as between the CRFM 50 and the engine 36. Referring also to FIG. 2, a pinion extension 70 extends between and interconnects the steering rack 68 and a steering wheel 72 of the vehicle 20. The steering wheel 72 is disposed within the passenger cabin 34 of the vehicle 20. The pinion extension 70 passes underneath the engine 36, i.e., at a vertical elevation that is below an elevation of the engine 36. The crank axis 42 is disposed vertically above the transmission output axis 48 a distance 52 sufficient to allow the steering pinion extension 70 to pass underneath the engine 36. The bore axis 56 is angled toward the forward end 28 of the vehicle structure 26 to define the angle 58 between the bore axis 56 and a vertical plane 57, which in some embodiments may allow for the vertical spacing between the crank axis 42 and the transmission output axis 48 within the vehicle's packaging constraints, which in turn allows the steering pinion extension 70 to pass underneath the engine 36. As noted above, in an exemplary embodiment the crank axis 42 is disposed vertically above the transmission output axis 48 the distance 52 of approximately 140 mm. As such, the pinion extension 70 is disposed closer to the horizontal plane 44 than the engine 36, i.e., the engine 36 is disposed at a higher elevation relative to the horizontal plane 44 than is the pinion extension 70, with the pinion extension 70 passing underneath the engine 36. It should be appreciated that the vertical spacing between the crank axis 42 and the transmission output axis 48 required to allow the pinion extension 70 to pass underneath is dependent upon several factors, including the diameter and/or size of the pinion extension 70, the size of the engine 36, the angle of the pinion extension 70 relative to the horizontal plane 44, the working angle of the universal joint 74, the position and adjustability of the steering wheel 72, etc.

The vehicle 20 may include at least one constant velocity joint 74 interconnecting the pinion extension 70 and the steering wheel 72. The steering wheel 72 may be mounted on either a right side of the longitudinal axis 24 to define a right hand mounted steering wheel 72, or a left side of the longitudinal axis 24 to define a left hand mounted steering wheel 72. The pinion extension 70 is configured for connection to either a right hand mounted steering wheel 72 or a left hand mounted steering wheel 72.

Figure 3:
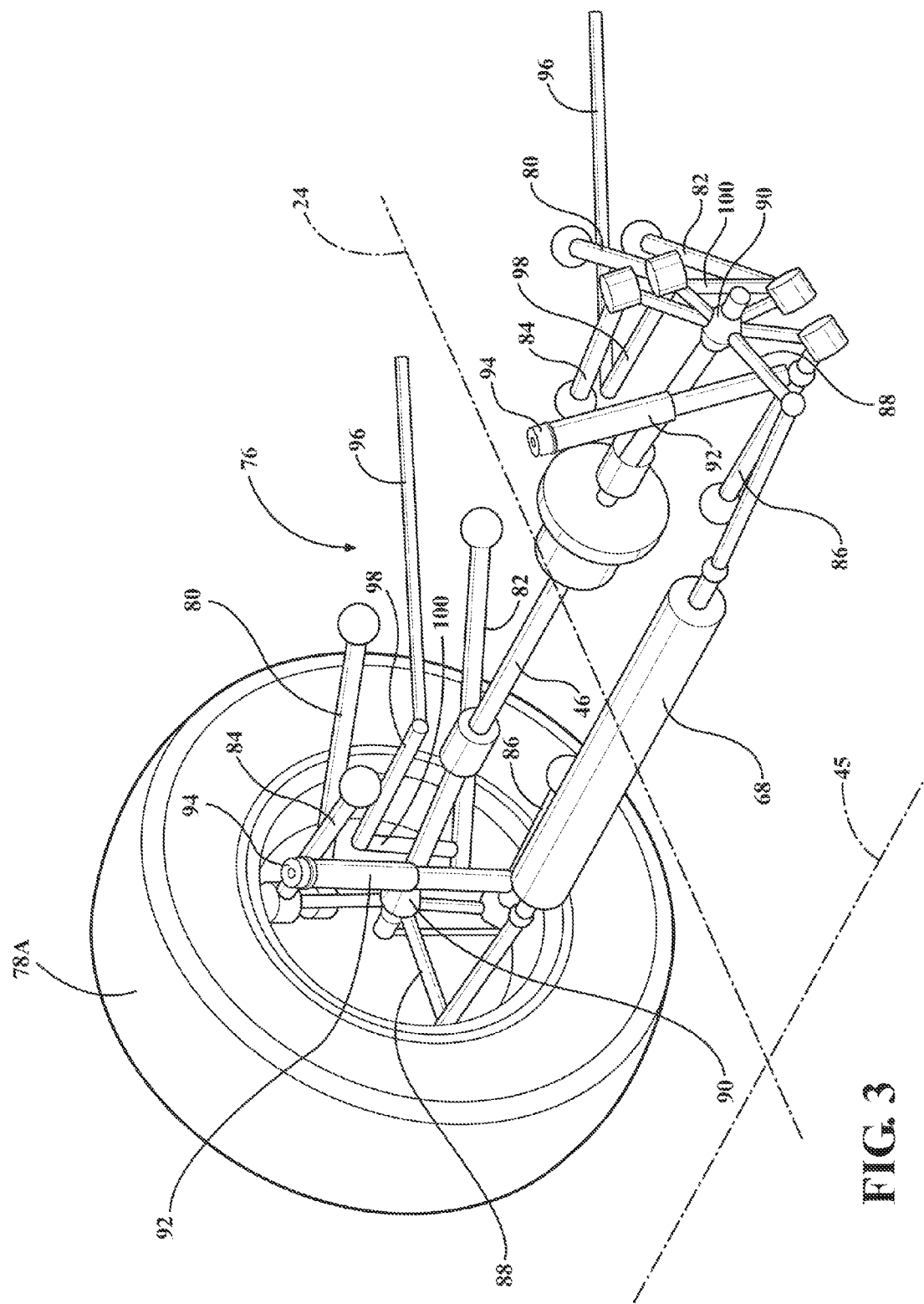
FIG. 3 is a schematic perspective view of a 5-link suspension system of the vehicle.

Referring to FIG. 3, a 5-link suspension system 76 connects a forward wheel assembly 78 to the vehicle structure 26. The vehicle 20 includes two front wheel assemblies, a first wheel assembly 78A disposed on a right side of the vehicle 20, and a second wheel assembly 78B disposed on a left side of the vehicle 20. Each of the first wheel assembly 78A and the second wheel assembly 78B are attached to the vehicle structure 26 with a 5-link suspension system 76 as described herein. As such, while the description below only describes the 5-link suspension system 76 for one of the wheel assemblies, it should be appreciated that the description applies to both the wheel assemblies of the vehicle 20.

The 5-link suspension system 76 includes an upper ride link 80, a lower ride link 82, an upper handling link 84, a lower handling link 86, and a steering link 88, all of which are joined together at an outboard end of each at a knuckle 90. As used herein, the terms "inboard" and "outboard" are used as relative positional terms to position features relative to the longitudinal axis 24 of the vehicle 20. As such, the term inboard refers to features that are closer or nearer the longitudinal axis 24 of the vehicle 20 than features referred to as outboard. The inboard end of each of the upper ride link 80, the lower ride link 82, the upper handling link 84, and the lower handling link 86 are attached to the vehicle structure 26. An inboard end of the steering link 88 is connected to the steering rack 68. The upper ride link 80 and the lower ride link 82 extend from the wheel knuckle 90 toward the rearward end 30 of the vehicle structure 26.

A shock absorber 92, having a concentric jounce bumper 94 attached to an end thereof, is attached to the lower handling link 86, and interconnects the lower handling link 86 and the vehicle structure 26. As is known, the shock absorber 92 dampens movement of the 5-link suspension system 76 and the attached wheel assembly 78 relative to the vehicle structure 26.

A torsion bar 96 is attached to the lower ride link 82, and interconnects the lower ride link 82 and the vehicle structure 26. The torsion bar 96 at least partially extends substantially parallel with and along the longitudinal axis 24. The torsion bar 96 may include a bell crank 98 and a load transfer link 100 to connect the torsion bar 96 to the lower ride link 82. The torsion bar 96 extends inboard of the knuckle 90, and is at least partially disposed inboard of a vehicle structure rail, i.e., a frame rail. The torsion bar 96 is configured for biasing the 5-link suspension system in a downward vertical direction relative to and against the vehicle structure 26. As such, the torsion bar 96 provides a spring force to the 5-link suspension system 76.

By positioning the transmission 38 forward of the engine 36, and raising the crank axis 42 of the crankshaft 40 relative to the output shaft 46 of the transmission 38, the wheel assembly 78 envelope, i.e., the wheelhouse, and steering rack 68 can be moved forward to enable a longer passenger cabin 34 measured along the longitudinal axis 24, with no or at least reduced intrusion into the passenger cabin 34 caused by the wheelhouse and the steering rack 68, thereby increasing the volume of the passenger cabin 34 without increasing the overall size of the vehicle 20. Desirable suspension and steering geometry is achieved by using the 5-link suspension system 76 with the longitudinal torsion bar 96 as the spring, which does not require any strut towers in the engine compartment 32.

In an exemplary embodiment, the above described powertrain 22 and chassis configuration provided an additional 120 mm of passenger cabin 34 length along the longitudinal axis 24, when compared to a traditional configuration in which the transmission 38 and steering rack 68 are disposed rearward of the engine 36. By positioning the transmission 38 forward of the engine 36, the wheel assembly 78 was moved 170 mm closer to the forward end 28 of the vehicle 20 when compared to a traditional powertrain 22 configuration, in which the transmission output axis 48 is disposed behind the crank axis 42 of the engine 36. By rotating the engine 36 about the crank axis 42, i.e., angling the bore axis 56 relative to the vertical plane 57, the intake manifold 60 is moved over the crank axis 42 and toward the forward end 28 of the vehicle 20, thereby reducing the overall length of the powertrain 22 along the longitudinal axis 24. Additionally, angling the bore axis 56 relative to the vertical plane 57 reduced the height of the exemplary embodiment of the powertrain 22 by 6 mm.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
a vehicle structure extending along a longitudinal axis between a forward end and a rearward end of the vehicle, wherein the forward end and the rearward end each extend along a cross-car axis substantially perpendicular to the longitudinal axis such that the longitudinal axis and the cross-car axis define a horizontal plane;
an engine supported by the vehicle structure and including a crankshaft defining a crank axis disposed transverse to the longitudinal axis of the vehicle structure and substantially parallel with the horizontal plane;
a transmission coupled to the engine and including a transmission output shaft engaging the crankshaft, wherein the transmission output shaft defines a transmission output axis disposed substantially transverse to the longitudinal axis and substantially parallel with the crank axis;
a steering rack supported by the vehicle structure forward of the transmission output axis, and including a pinion extension extending toward the rearward end of the vehicle structure;
a 5-link suspension system connecting a forward wheel assembly to the vehicle structure, wherein the 5-link suspension system includes an upper ride link, a lower ride link, an upper handling link, a lower handling link, and a steering link;
wherein the transmission output axis is disposed nearer the forward end of the vehicle structure than the crank axis; and
wherein the crank axis is disposed vertically above the transmission output axis such that the pinion extension passes underneath the engine.

2. The vehicle as set forth in claim 1 wherein the crank axis is disposed vertically above the transmission output axis a distance of approximately 140 mm.

3. The vehicle set forth in claim 2 wherein the distance is between the range of 137 mm and 147 mm.

4. The vehicle as set forth in claim 1 wherein the crank axis is disposed vertically above the transmission output axis a distance of at least 140 mm.

5. The vehicle set forth in claim 1 wherein the engine includes at least one cylinder bore defining a bore axis disposed substantially perpendicular to the crank axis, wherein the bore axis is angled toward the forward end of the vehicle structure to define an angle between the bore axis and a vertical plane disposed substantially perpendicular to the horizontal plane and substantially parallel with the crank axis, and wherein the angle is at least 15°.

6. The vehicle set forth in claim 5 wherein the angle between the bore axis and the vertical plane is approximately 18°.

7. The vehicle set forth in claim 5 further comprising an intake manifold disposed vertically above and arranged over the crank axis of the crankshaft.

8. The vehicle set forth in claim 1 further comprising a steering rack supported by the vehicle structure, and disposed nearer the forward end of the vehicle structure than the transmission.

9. The vehicle set forth in claim 8 further comprising a steering wheel disposed in a passenger cabin, nearer the rearward end of the vehicle structure than the engine.

10. The vehicle set forth in claim 9 wherein the pinion extension extends between and interconnects the steering rack and the steering wheel.

11. The vehicle set forth in claim 10 further comprising at least one constant velocity joint interconnecting the pinion extension and the steering wheel.

12. The vehicle set forth in claim 11 wherein the steering wheel may be mounted on either a right side of the longitudinal axis to define a right hand mounted steering wheel, or a left side of the longitudinal axis to define a left hand mounted steering wheel, and wherein the pinion extension is configured for connection to either the right hand mounted steering wheel or the left hand mounted steering wheel.

13. The vehicle set forth in claim 1 wherein the upper ride link and the lower ride link extend from a wheel knuckle toward the rearward end of the vehicle structure.

14. The vehicle set forth in claim 1 further comprising a shock absorber having a concentric jounce bumper attached to and interconnecting the lower handling link and the vehicle structure, for damping movement of the 5-link suspension system relative to the vehicle structure.

15. The vehicle set forth in claim 1 further comprising a torsion bar at least partially extending longitudinally along the longitudinal axis of the vehicle structure, wherein the torsion bar is attached to and interconnects the lower ride link and the vehicle structure, and is configured for biasing the 5-link suspension system in a downward vertical direction relative to and against the vehicle structure.

16. The vehicle set forth in claim 1 further comprising an exhaust system including an exhaust manifold attached to the engine and disposed nearer the forward end of the vehicle structure than the engine, wherein the exhaust system includes a passage connected to the exhaust manifold, and extending downward in front of the engine, nearer the forward end of the vehicle structure than the engine, and passing underneath the engine.

17. A vehicle comprising:
a vehicle structure extending along a longitudinal axis between a forward end and a rearward end of the vehicle, wherein the forward end and the rearward end each extend along a cross-car axis substantially perpendicular to the longitudinal axis such that the longitudinal axis and the cross-car axis define a horizontal plane;
an engine supported by the vehicle structure and including a crankshaft defining a crank axis disposed transverse to the longitudinal axis of the vehicle structure, and substantially parallel with the horizontal plane;
a transmission supported by the vehicle structure and coupled to the engine for receiving torque from the crankshaft, the transmission including an output shaft defining a transmission output axis disposed transverse to the longitudinal axis and parallel with the crank axis;
wherein the transmission output axis is disposed nearer the forward end of the vehicle structure than the crank axis;
wherein the transmission output axis is disposed vertically below the crank axis a distance of approximately 140 mm;
wherein the engine includes at least one cylinder bore defining a bore axis disposed perpendicular to the crank axis;
wherein the bore axis is angled toward the forward end of the vehicle structure to define an angle between the bore axis and a vertical plane disposed perpendicular to the horizontal plane and parallel with the crank axis;
wherein the angle is approximately 18°;

a 5-link suspension system connecting a forward wheel assembly to the vehicle structure, wherein the 5-link suspension system includes:
an upper ride link, a lower ride link, an upper handling link, a lower handling link, and a steering link;
wherein the upper ride link and the lower ride link extend from a wheel knuckle toward the rearward end of the vehicle structure;
a shock absorber having a concentric jounce bumper attached to and interconnecting the lower handling link and the vehicle structure, for damping movement of the 5-link suspension system relative to the vehicle structure; and
a torsion bar at least partially extending longitudinally along the longitudinal axis of the vehicle structure, wherein the torsion bar is attached to and interconnects the lower ride link and the vehicle structure, and is configured for biasing the 5-link suspension system in a downward vertical direction relative to and against the vehicle structure.

18. The vehicle set forth in claim 17 further comprising a steering rack supported by the vehicle structure, and disposed nearer the forward end of the vehicle structure than the transmission, and a pinion extension extending between and interconnecting the steering rack and a steering wheel, wherein the crank axis is disposed vertically above the transmission output axis a distance to allow the pinion extension to pass underneath the engine.

* * * * *